(12) United States Patent
Ohashi

(10) Patent No.: US 12,422,514 B2
(45) Date of Patent: Sep. 23, 2025

(54) INFORMATION PROCESSING SYSTEM AND PROGRAM

(71) Applicant: Sony Interactive Entertainment Inc., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 716 days.

(21) Appl. No.: 17/775,272

(22) PCT Filed: Sep. 24, 2020

(86) PCT No.: PCT/JP2020/036137
§ 371 (c)(1),
(2) Date: May 7, 2022

(87) PCT Pub. No.: WO2021/095371
PCT Pub. Date: May 20, 2021

(65) Prior Publication Data
US 2022/0390543 A1    Dec. 8, 2022

(30) Foreign Application Priority Data

Nov. 11, 2019   (JP) ................................. 2019-204250

(51) Int. Cl.
*G01S 5/00*    (2006.01)
*G07C 9/00*    (2020.01)
(Continued)

(52) U.S. Cl.
CPC ........ *G01S 5/0036* (2013.01); *G07C 9/00658* (2013.01); *G07C 9/27* (2020.01); *G07C 9/28* (2020.01)

(58) Field of Classification Search
CPC .......... G01S 5/0036; G07C 9/27; G07C 9/28; G07C 9/00658
See application file for complete search history.

(56) References Cited

U.S. PATENT DOCUMENTS 10,641,865 B2    5/2020  Koga
2018/0164404 A1*  6/2018  Koga ...................... G01S 19/42

FOREIGN PATENT DOCUMENTS

JP    2012212225 A  *  11/2012
JP    2013077118 A     4/2013
(Continued)

OTHER PUBLICATIONS

International Search Report for corresponding PCT Application No. PCT/JP2020/036137, 4 pages, Dec. 28, 2020.

*Primary Examiner* — Khai M Nguyen
(74) *Attorney, Agent, or Firm* — Kilpatrick Townsend & Stockton LLP (57) ABSTRACT

In an information processing system including a terminal device carried by a user and a server device communicably connected to the terminal device by a secure communication method, the terminal device acquires a sensing result in a real space where the terminal device is located and sends the same to the server device, and the server device holds base information for specifying at least one position in the real space as an information processing base, and sends an information processing instruction to the terminal device in a case where a predetermined condition defined using a distance or a direction between a position specified by the sensing result received from the terminal device and a position specified by the base information is satisfied.

11 Claims, 4 Drawing Sheets

(51) Int. Cl.
G07C 9/27 (2020.01)
G07C 9/28 (2020.01)

(56) References Cited

FOREIGN PATENT DOCUMENTS

| | | | |
|---|---|---|---|
| JP | 2018010612 A | 1/2018 | |
| JP | 2018097683 A | 6/2018 | |
| WO | WO-2019088137 A1 * | 5/2019 | ............. G06F 13/00 |
| WO | WO-2019155775 A1 * | 8/2019 | ............. H04M 9/00 |

* cited by examiner

INFORMATION PROCESSING SYSTEM AND PROGRAM

TECHNICAL FIELD

The present invention relates to an information processing system and a program.

BACKGROUND ART

In recent years, various technologies using position information provided by GPS (Global Positioning System) and the like have been developed. For example, there is a technique for unlocking a key by using position information when approaching a locked door.

SUMMARY

Technical Problem

However, since the accuracy of the position information is at most a meter unit in the conventional technology using the position information, it is common to input a password and use a proximity sensor together in reality. That is, in the conventional example, the technology for unlocking the door by using the position information requires an external device and is less convenient. In addition, there has been a restriction on a place or the like where a device for unlocking the door by using the position information can be installed. This is not limited to locking and unlocking the door, but has been also the same in other applications.

The present invention has been made in view of the above circumstances, and one object thereof is to provide an information processing system capable of improving the convenience of using position information.

Solution to Problem

According to one aspect of the present invention to solve the problem in the above-described conventional example, provided is an information processing system including a terminal device carried by a user and a server device communicably connected to the terminal device by a secure communication method. The terminal device includes acquisition means for acquiring a sensing result in a real space where the terminal device is located and sending means for sending the acquired sensing result in the real space to the server device. The server device has holding means for holding base information that specifies at least one position in the real space as an information processing base, reception means for receiving the sensing result from the terminal device and processing means for sending, in a case where a predetermined condition defined using a distance or a direction between a position specified by the received sensing result and a position specified by the base information held by the holding means is satisfied, an information processing instruction to the terminal device that is the transmission source of the sensing result. The terminal device accepts the information processing instruction from the server device to execute a predetermined process.

Advantageous Effect of Invention

According to the present invention, it is possible to improve the convenience of using position information.

DESCRIPTION OF EMBODIMENT

An embodiment of the present invention will be described with reference to the drawings. As exemplified in FIG. 1, an information processing system 1 according to the present embodiment includes a server device 10 and a plurality of terminal devices 20 held by a plurality of users. In addition, the server device 10 is communicably connected to a position information management server 30.

The position information management server 30 is, for example, what is generally called an AR (Augmented Reality) cloud server. As exemplified in FIG. 2, the position information management server 30 includes a position information database in which information (S) relating to a predetermined feature point in an image obtained by photographing each location is associated with position information (P) of the location.

Figure 2:
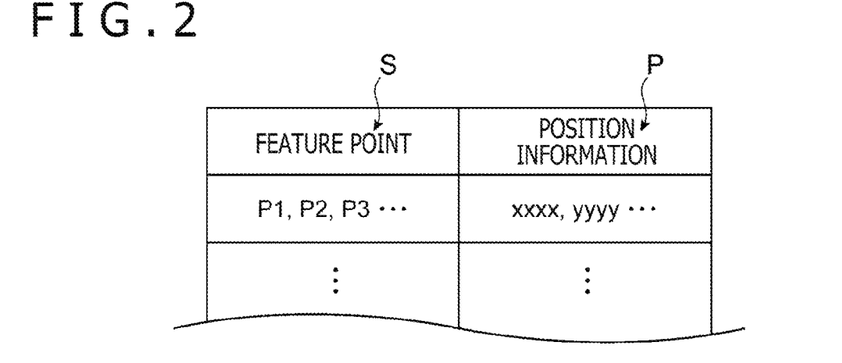
FIG. 2 is an explanatory diagram for depicting an example of contents of a position information database used by the information processing system according to the embodiment of the present invention.

In addition, the position information management server 30 receives an inquiry about the position information together with the information relating to the feature point from the server device 10 or the like. The position information management server 30 uses the received information relating to the feature point as a key to retrieve information relating to a feature point corresponding (similar) to the information relating to the feature point as the key from the position information database. When information is found by the retrieval, the position information management server 30 acquires position information associated with the found information. Here, the position information acquired by the position information management server 30 may include not only information indicating a position in the world coordinate system, such as latitude and longitude information, but also pose information (information indicating a three-dimensional orientation in the world coordinate system: global pose information and the like) at the position. The position information management server 30 provides the acquired position information to the server device 10 or the like of the request source.

The server device 10 is a general server computer. The server device 10 includes a control unit 11, a storage unit 12, and a communication unit 13 as exemplified in FIG. 1. Here, the control unit 11 is a program control device such as a CPU (Central Processing Unit), and operates according to a program stored in the storage unit 12.

Figure 1:
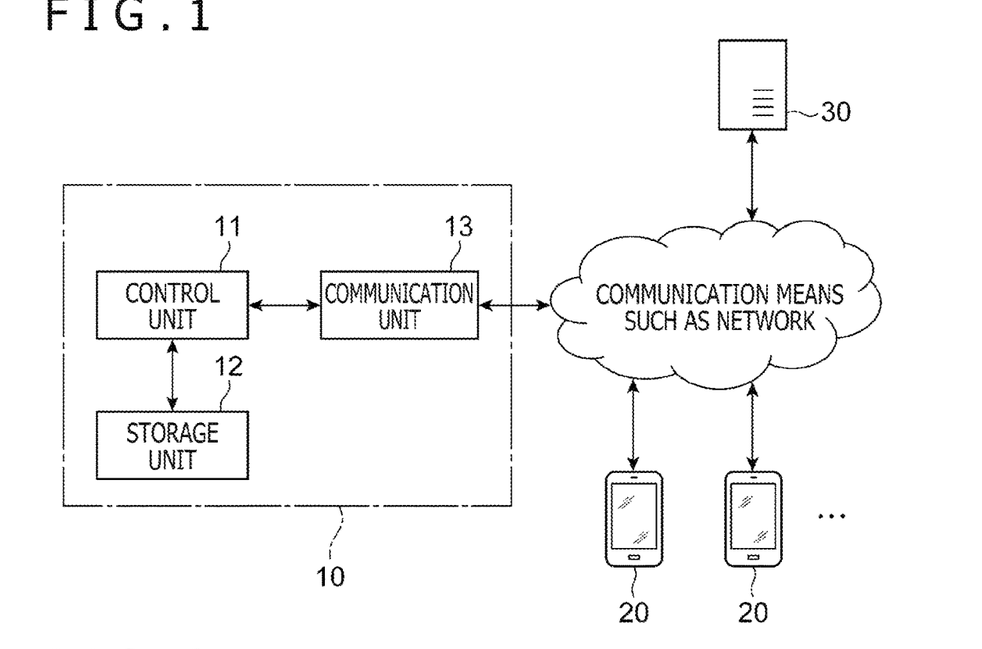
FIG. 1 is a configuration block diagram for depicting an example of an information processing system according to an embodiment of the present invention.

In the example of the present embodiment, the control unit 11 executes the program stored in the storage unit 12. Then, the control unit 11 receives a sensing result (hereinafter, referred to as spatial sense information) of a real space from the terminal device 20. The spatial sense information is information necessary for specifying the position of the terminal device 20 in the real space, and the concrete contents thereof will be described later.

In addition, the control unit 11 refers to base information that is stored in the storage unit 12 and that specifies at least one position in the real space as an information processing base. Then, the control unit 11 determines whether or not the referenced base information satisfies a predetermined condition. Here, the predetermined condition is a condition defined by using a distance or a direction between a position specified by the spatial sense information received from the terminal device 20 and a position specified by the base information. That is, in this case, the control unit 11 retrieves, from the base information stored in the storage unit 12, base information that satisfies the predetermined condition defined by using the distance or direction between the position of the terminal device 20 and the position specified by the base information.

In a case where the predetermined condition is satisfied, that is, in a case where the base information satisfying the predetermined condition is found by the retrieval, the control unit 11 sends an information processing instruction according to the base information to the terminal device that is the transmission source of the spatial sense information. The detailed operation of the control unit 11 will be described later.

The storage unit 12 includes at least one memory device such as a RAM (Random Access Memory), and holds a program executed by the control unit 11. In addition, the storage unit 12 also operates as a work memory of the control unit 11. In addition, in the present embodiment, the storage unit 12 may record an event database that holds event information associated with the position information.

Figure 3:
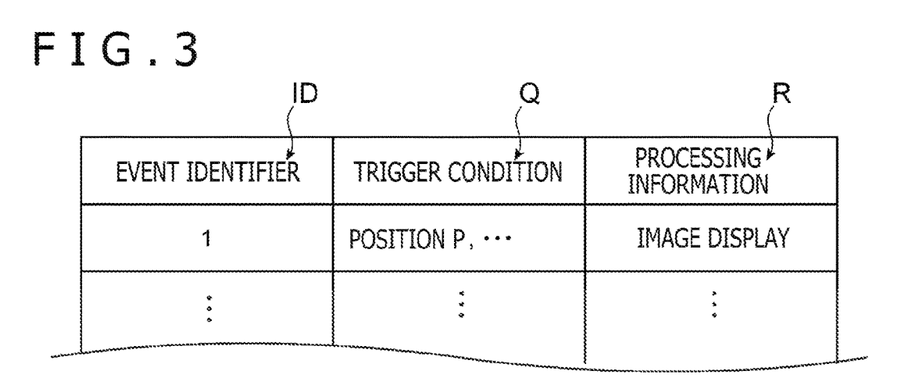
FIG. 3 is an explanatory diagram for depicting an example of contents of an event database used in the information processing system according to the embodiment of the present invention.

As exemplified in FIG. 3, the event database records an event identifier (ID), a trigger condition (Q), and processing information (R) indicating the contents of the event in association with each other. The trigger condition (Q) may be a condition based on base information specifying a position (information processing base) where predetermined information processing is to be performed, information relating to time, and user authentication information (user name or the like). As an example, the trigger condition (Q) includes base information specifying at least one position in the real space as an information processing base.

In addition, the communication unit 13 is a network interface or the like, and transmits and receives various kinds of information to/from the position information management server 30 and the terminal device 20 in accordance with an instruction input from the control unit 11.

The terminal device 20 is, for example, a device that is held by a user and is capable of communicating with the server device 10, such as a smartphone or a wearable device such as a smartwatch or a ring-shaped device. In addition, in the present embodiment, the terminal device 20 may include, as display means, a head-mounted display that is mounted on the head of the user and projects an image of a virtual space together with an image of the real space onto the eyes of the user.

The terminal device 20 in the present embodiment executes an application program or the like to acquire the spatial sense information in the real space where the terminal device 20 is located. The spatial sense information may be, for example, information relating to image data imaged by a camera or the like, or a feature point extracted under a predetermined condition from the image data imaged by the camera or the like. The feature point may be a feature point used in what is generally called a SLAM (Simultaneous Localization and Mapping) technology, such as a point indicating each position of the vertexes of a polygonal body imaged as image data. In addition, the spatial sense information may include position information (referred to as GPS position information) based on a signal received from a GPS satellite or the like.

Further, the terminal device 20 sends the acquired spatial sense information to the server device 10. At this time, the terminal device 20 and the server device 10 may be connected to each other by a secure communication method. As the secure communication method, for example, various methods such as a method using SSL (Secure Socket Layer) or a method for encrypting by a predetermined method can be used.

In addition, the terminal device 20 receives an information processing instruction from the server device 10 serving as the destination of the spatial sense information, and executes predetermined information processing based on the received information processing instruction. Here, the predetermined information processing includes, for example, a process for accepting a predetermined information input from the user.

In addition, as an example, the information processing instruction may include an instruction for displaying an image of the virtual space to be displayed while being superimposed on the visual field (visual field of the visually-recognized real space) of the user, for example. Further, the terminal device 20 sends the information accepted from the user to the server device 10 and provides the information to the information processing in the server device 10. The concrete processing contents of the terminal device 20 will be also described later.

Here, an operation of the control unit 11 of the server device 10 will be described. In the present embodiment, the control unit 11 functionally includes an authentication processing unit 21, a terminal position estimation unit 22, a condition determination unit 23, an event management unit 24, and an event processing unit 25, as exemplified in FIG. 4.

Figure 4:
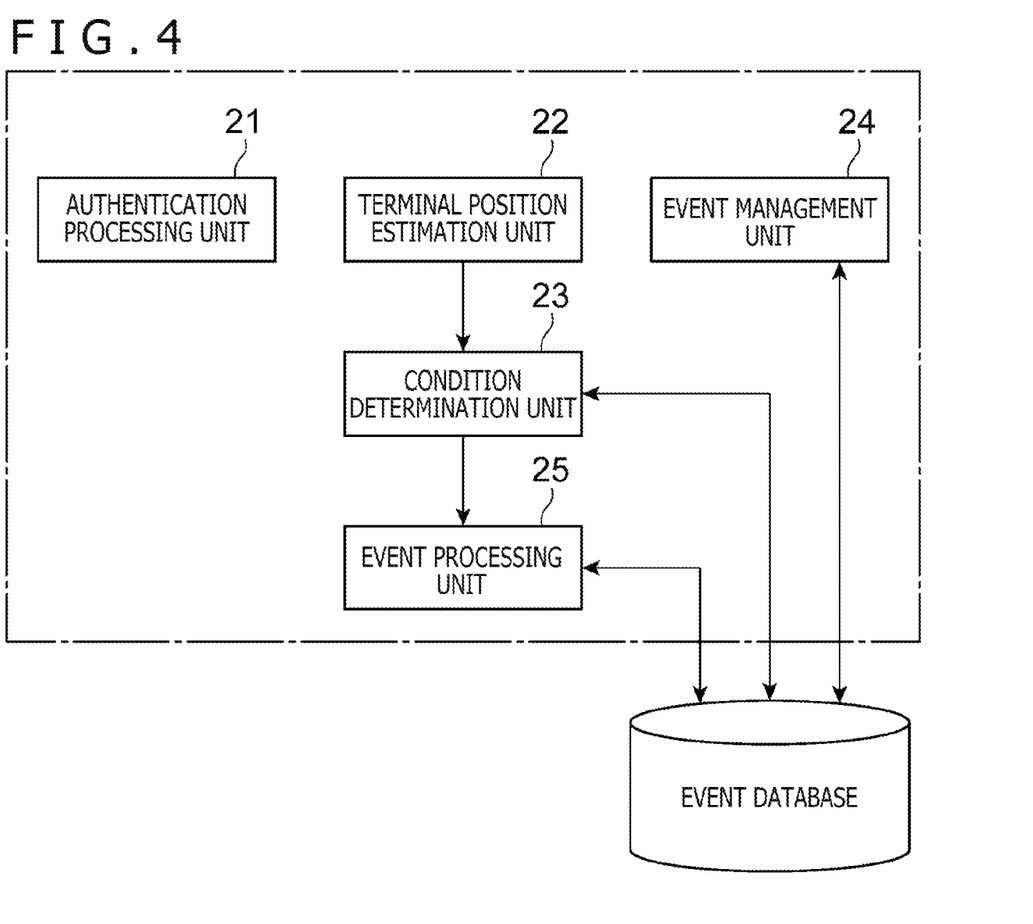
FIG. 4 is a functional block diagram for depicting an example of a server device of the information processing system according to the embodiment of the present invention.

The authentication processing unit 21 authenticates the terminal device 20. As the authentication process, a widely known method such as using preliminarily-issued authentication information (certificate information, information for specifying a user name, or the like) on the terminal device 20 side can be employed. When succeeding in the authentication of the terminal device 20, the authentication processing unit 21 outputs information of the fact to each unit.

The terminal position estimation unit 22 receives the spatial sense information from the terminal device 20 that has been successfully authenticated by the authentication processing unit 21. Then, the terminal position estimation unit 22 sends information relating to a feature point included in the spatial sense information to the position information management server 30. Then, the positional information is received from the position information management server 30 and output to the condition determination unit 23.

In addition, at this time, the control unit 11 of the server device 10 may record the position information of the terminal device 20 obtained by the terminal position estimation unit 22, in association with information for specifying the user of the terminal device 20 (the information may be a user name or the like, for example) and information indicating the date and time when the position information has been obtained.

It should be noted that in a case where the terminal device 20 has sent the GPS position information acquired by the GPS or the like, in a form included in the spatial sense information, the terminal position estimation unit 22 may use the GPS position information to determine a range for retrieving a feature point.

The condition determination unit 23 retrieves the event database by using, as a key, the position information in the real space where the terminal device 20 is located, the position information being acquired by the terminal position estimation unit 22. Specifically, the condition determination unit 23 retrieves a trigger condition including base information in which at least one of a distance and a direction from the position information as the key satisfies a predetermined condition. Here, when a trigger condition satisfying the condition is found, the condition determination unit 23 outputs an event identifier associated with the trigger condition to the event processing unit 25.

The event management unit 24 accepts information for specifying a position to be an information processing base, information for specifying a time zone, or the like from the user (in this case, the user who provides content or the like, hereinafter referred to as a providing user for distinction) of the authenticated terminal device 20, and information indicating the contents of information processing to be performed at the information processing base. Then, the event management unit 24 issues a unique event identifier and stores the issued event identifier and these pieces of information in the event database in association with each other.

Specifically, the event management unit 24 accepts, as a trigger condition, the information that is input by, for example, the providing user of the terminal device 20 by operating the terminal device 20 and that specifies a position to be an information processing base. In addition, the event management unit 24 accepts the input of information relating to information processing to be performed at the information processing base according to the accepted trigger condition, for example, a content video to be reproduced at the information processing base, and transmits these pieces of information to the server device 10.

Here, information as the trigger condition may be, for example, information specifying the direction (such as which direction is the front or the like) of a rectangular parallelepiped region in the world coordinate system. In addition, the content video is, for example, a video in which, for example, the providing user himself/herself is playing some musical instrument, or the like, as will be described later.

The event management unit 24 of the server device 10 receives the information as the trigger condition, the information relating to information processing, and the like and issues a unique event identifier (ID). By the event management unit 24, the information that is received from the terminal device 20 and that specifies a position to be an information processing base is set as the trigger condition (Q), and the content video received from the terminal device 20 and the information processing instruction (which is assumed to be selected by the providing user) to perform a process for reproducing the content video are set as the processing information (R) indicating the contents of the event. The event management unit 24 then records the event identifier (ID), the trigger condition (Q), and the processing information (R) in the event database in association with each other. In addition, at this time, the event management unit 24 may record information for specifying the providing user of the terminal device 20 having received these pieces of information as registrant information, in association with the event identifier.

It should be noted that the trigger condition in this case may include, but is not limited to, the fact that the authentication has been started, and may be a condition that the user (the user who receives the provision of content and the like, hereinafter referred to as a provided user) is located in the vicinity (the range where the event can be visually recognized).

In addition, the event management unit 24 may accept the input of the trigger condition and the processing information not from the terminal device 20 but from the administrator of the server device 10, and may register them in the event database. Also in this case, the event management unit 24 issues a unique event identifier (ID), and records the trigger condition (Q) and the processing information (R) input from the administrator in the event database, in association with each other.

The event processing unit 25 accepts the input of the event identifier output from the condition determination unit 23, reads the processing information (R) associated with the event identifier input from the event database, and performs a process based on the processing information. For example, in a case where the processing information includes an instruction to reproduce content data in the terminal device 20, the event processing unit 25 sends the processing information to the terminal device 20 whose position information is estimated by the terminal position estimation unit 22.

[Operation] The present embodiment basically includes the above-described configuration and operates as follows. In the following description, it is assumed that information q1 for specifying an information processing base as the trigger condition and, as the processing information, video content in which the providing user is playing a musical piece and an instruction (r1) for reproducing the video content are associated with the event identifier "1" in the event database. In addition, it is assumed that the information q1 for specifying the information processing base is, for example, information for specifying a hexahedral region which is arranged in the square in front of a station X and whose front faces the station side.

Figure 5:
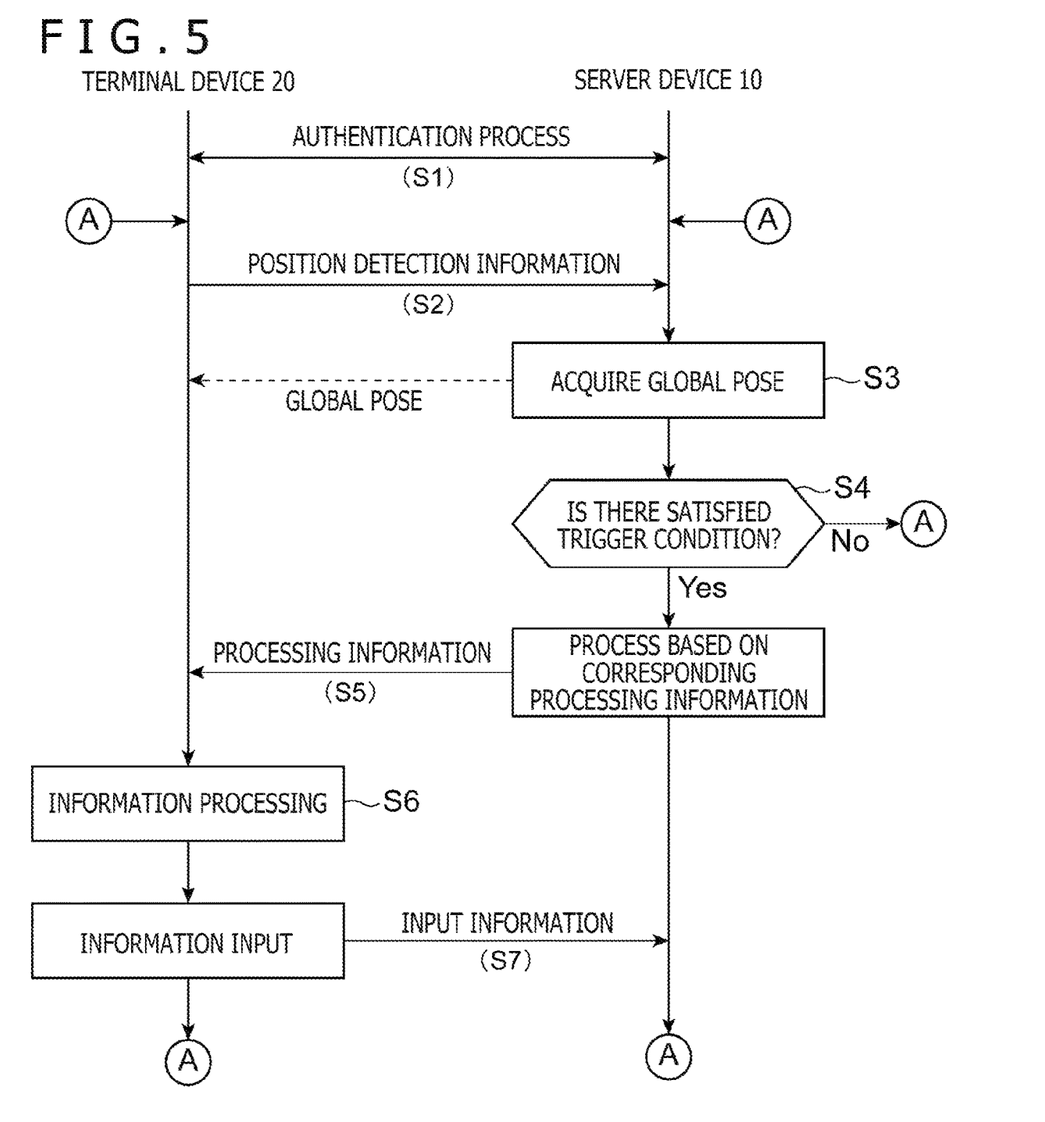
FIG. 5 is a flowchart for depicting an operation example of the information processing system according to the embodiment of the present invention.

In this example, as depicted in FIG. 5, the user (the user may be or may be not the providing user who has set the event with the event identifier "1") operates the terminal device 20 to be authenticated by the server device 10 (S1). This authentication may be the same as the procedure of starting the SSL communication. In this case, for example, the server device 10 may store the client certificate and the information (user name or the like) for specifying the user in association with each other. Through this authentication procedure, the server device 10 authenticates the user for each terminal device 20.

The terminal device 20 sends GPS position information (rough position information) and image data obtained by imaging the visual line direction of the provided user to the server device 10 as spatial sense information (S2). It is assumed that the terminal device 2 repeats the process of the process S2 at every predetermined timing. For example, the terminal device 20 of the provided user who has arrived at the square in front of the station X sends image data obtained by imaging the square in front of the station X to the server device 10 while being included in the spatial sense information.

The server device 10 receives the spatial sense information, makes an inquiry to the position information management server 30 or the like, and acquires the position information (global pose) of the terminal device 20 in the world coordinate system (S3). In this example, the position information management server 30 provides the global pose of the provided user facing the square in front of the station X. In an example of the present embodiment, the server device 10 records the position information of the terminal device 20 acquired here, in association with the information for specifying the user of the terminal device 20. At this time, the server device 10 may further record information of the date and time when the position information has been acquired (which may be acquired from, for example, an NTP server or the like at the time of processing), in association with the position information. As a result of this recording, the server device 10 is in a state of recording information of sequential positions of the terminal device 20.

The server device 10 retrieves the event database by using the acquired position information as a key, and retrieves a trigger condition including base information satisfying a condition that a distance from a position indicated by the position information as the key is smaller than a predetermined threshold value or a condition that a direction indicated by the position information as the key is within a predetermined threshold value from a corner facing the front direction (facing) (S4). Here, when a trigger condition satisfying the condition is found, the server device 10 reads the processing information (R) associated with the trigger condition and sends the processing information to the terminal device 20 (S5).

In the example of the present embodiment, when the provided user approaches the region indicated by the information q1 that is stored in the event database and that specifies the processing base, the server device 10 reads the processing information (r1) associated with the event identifier "1," on the assumption that the trigger condition associated with the event identifier "1" is satisfied, and sends the processing information to the terminal device 20. At this time, the server device 10 transmits the event identifier together with the processing information.

Here, since the processing information (r1) includes the video content in which the providing user is playing a musical piece and the instruction to reproduce the video content, as described above, the terminal device 20 reproduces the video content in accordance with the instruction (S6). In addition, at this time, the terminal device 20 may accept an information input by the provided user. As a concrete example, the terminal device 20 accepts, from the provided user, an instruction to give a tip to the video content being reproduced or an instruction to purchase the musical piece, and transmits input information including the event identifier, the amount of the tip to be given, and a purchase amount (designated by the provided user) to the server device 10 (S7).

In order to indicate the intention, such as giving the tip or purchasing the musical piece, of the provided user, the provided user gives an instruction by a gesture or the like to the image of a virtual interface displayed in the visual field of the provided user by the terminal device 20. As a method of presenting the image of such a virtual interface and inputting by a gesture to the image, an already-known method can be employed.

Here, as a gesture, a menu object (an object that indicates options such as "Yes" and "No") displayed as the virtual interface is virtually grasped and moved in such a manner as to be superimposed on a "decision" object, and the state in which the menu object is superimposed on the "decision" object is maintained only for a predetermined period of time.

In addition, the gesture may be not only
"Grasp and move an object,"
"Superimpose an object on another object," and
"Maintain a predetermined state only for a predetermined period of time" in this case, but also
"Move a virtually grasped object in such a manner as to be superimposed on a plurality of other objects in a predetermined order,"
"Move an object along a predetermined trajectory," and the like. Further, it is not necessary for the "decision" object in this case to be at a location close to the object indicating options such as "Yes" and "No," and the object of the option grasped by the provided user may be moved to and superimposed on the position of the "decision" object by the provided user holding the terminal device 20 while maintaining the state of grasping operation.

In addition, the plurality of objects may similarly be located at positions where it is necessary to be moved by the provided user holding the terminal device 20, and the trajectories may also be trajectories taken when the objects are moved by the provided user holding the terminal device 20. In the present embodiment, since the server device 10 sequentially acquires and records the position information of the terminal device 20, it is possible to perform a process using the information of the movement trajectory of the position.

In an example of the present embodiment, since the indication of the intention of the user using the position information can be accepted in this way, for example, the following process can be performed. That is, in the state in which a product displayed as a virtual object is grasped, the product is moved to another virtual object which indicates the intention of settlement and which is in another location that is different from the original location of the product, and the purchase settlement of the product is completed by staying there for a predetermined period of time or longer.

It should be noted that in the present embodiment, in a case where the user cannot confirm display means because, for example, the user is not wearing a head-mounted display, the terminal device 20 may send the information of the fact to the server device 10. Alternatively, when the user can confirm display means because, for example, the user is wearing a head-mounted display, the terminal device 20 may continue to send the information of the fact that the display means can be confirmed to the server device 10 by repeating at every predetermined timing. In the latter case, when the information of the fact that the display means can be confirmed is not received for a predetermined period, the server device 10 determines that the display means cannot be confirmed by the terminal device 20.

Then, when the information of the fact that the display means cannot be confirmed is received from the terminal device 20, or when the server device 10 determines that the display means cannot be confirmed by the terminal device 20, the server device 10 may determine that the user cannot recognize the information from the server device 10, and may return to the process S2 by interrupting the process S4 and the following processes, on the assumption that the user cannot indicate the intention.

The server device 10 executes a predetermined process on the basis of input information input by the provided user in the terminal device 20. For example, when receiving the event identifier and the amount of the tip to be given from the terminal device 20, the server device 10 refers to the position information recorded in association with the user name of the terminal device 20, and determines whether or not the record of the position information satisfies predetermined conditions.

Here, the predetermined conditions can be conditions that the position information associated with the user name is sequentially and continuously recorded within a predetermined time interval and that predetermined N (N is a natural number) consecutive records same as the latest N records are not included in the past records of position information recorded earlier than the N records.

By making a determination based on the conditions, it is possible to prevent the user from camouflaging his/her own location or performing an illegal operation from a remote place. For example, in a case where a malicious user records a video of a place where the user has been located in the past, transmits the recorded video to the server device 10, and camouflages as if the user were in the place, the record completely matches a series of past records of position information, and the camouflage can thus be eliminated under the above conditions.

If the server device 10 determines that the conditions are not satisfied, the process is not executed (an error is notified). In addition, in a case where the above conditions are satisfied, the server device 10 refers to the registrant information of the event identified by the event identifier and executes a process (payment process or the like) for giving the tip of the received amount to the providing user indicated by the registrant information.

In addition, in another example, the provided user may operate the terminal device 20 to input his/her impressions. Also in this case, the terminal device 20 transmits the information of the impressions together with the event identifier to the server device 10. When receiving the information of the impressions together with the event identifier, the server device 10 refers to the registrant information of the event identified by the event identifier and executes a process for accumulating the information of the impressions in association with the providing user indicated by the registrant information. The information of the impressions accumulated by the process is transmitted and presented to the providing user after being accessed later from the providing user indicated by the registrant information. The information processing system of the present embodiment repeatedly executes the processes from the process S2 to the process S6 or S7.

According to this example of the present embodiment, a providing user A generates video content by photographing a video in which the user himself or herself is playing a musical piece, and registers the video content as an event in the server device 10, so that it is possible to virtually configure a situation in which it looks like as if his or her alter ego were playing a musical piece at a designated place.

Another provided user B who has visited the designated place can view the performance of the providing user A, and can perform operations such as inputting impressions or giving a tip by inputting information of the provided user B himself/herself.

It should be noted that the video content registered as an event here may be represented by what is generally called point group data in which a three-dimensional image is represented by a plurality of voxels, or may be represented by polygon data or the like. In a case where the video content registered as an event is data representing a virtual object in a three-dimensional virtual space as described above, a composite image obtained by combining the image data of the virtual object in the virtual space with an image at a position (a range indicated by the information of the information processing base) designated in the real space may be presented to the provided user. Such a process can use a process widely known as AR processing.

In addition, on the assumption that any of the trigger conditions is satisfied, the terminal device 20 that has received the processing information from the server device 10 may perform control to increase the frequency (the frequency of execution of the process S2) of transmission of the spatial sense information in a state where any of the trigger conditions is not satisfied (a state before the reception of the processing information, or when a predetermined time has elapsed since the last reception of the processing information, or when the provided user has performed a process of the termination of the process).

[Condition determination on terminal side] In addition, in the above description, the server device 10 determines whether or not the trigger condition stored in the event database is satisfied, but the present embodiment is not limited to this example, and the terminal device 20 may determine whether or not the trigger condition is satisfied.

In this case, the control unit 11 of the server device 10 transmits the position information to the terminal device 20. Further, as an operation of the condition determination unit 23, the control unit 11 retrieves the event database by using, as a key, the position information in the real space where the terminal device 20 is located, the position information being acquired by the terminal position estimation unit 22, and retrieves the trigger condition including the base information in which a distance from the position information as the key is less than a predetermined first threshold value (threshold value indicating a relatively long distance). Here, when a trigger condition satisfying the condition is found, the condition determination unit 23 in this example sends, to the terminal device 20, a set (a plurality of sets may be used) in which the event identifier associated with the trigger condition is associated with the trigger condition.

When the terminal device 20 side receives the set of the event identifier and the trigger condition associated with each other from the server device 10, the terminal device 20 retrieves, by using, as a key, the position information separately received from the server device 10, a trigger condition including the base information in which at least one of the distance and the direction from the position information as the key satisfies a predetermined condition, from the received trigger conditions. It is sufficient if the predetermined condition is, for example, a condition that the distance is less than a predetermined second threshold value (threshold value indicating a distance relatively smaller than the first threshold value).

The terminal device 20 sends, to the server device 10, the event identifier associated with the trigger condition that is found by the retrieval process and that satisfies the predetermined condition.

The event processing unit 25 of the server device 10 in this example reads, from the event database, the processing information (R) associated with the event identifier received from the terminal device 20, and performs a process based on the processing information. For example, in a case where the processing information includes an instruction to reproduce content data in the terminal device 20, the event processing unit 25 sends the processing information to the terminal device 20 that is the transmission source of the event identifier.

It should be noted that the terminal device 20 may send, to the server device 10, the event identifier together with authentication information relating to the event identified by the event identifier. As the authentication information, for example, various kinds of data such as a passcode, biometrics information such as the fingerprint or the iris of the user, gestures and operations performed by the user, and voice data can be used.

In a case where such authentication information is used, the event processing unit 25 of the server device 10 executes information processing based on the processing information by using the authentication information received together with the event identifier.

For example, in a case where the information processing is to send a command (unlocking instruction) to a predetermined URL (Uniform Resource Locator) (for example, the URL of an API (Application Programming Interface) for unlocking a door key) together with the authentication information, the server device 10 sends the authentication information received from the terminal device 20 and the unlocking instruction to the predetermined URL, as an operation of the event processing unit 25.

In this example, another server device that performs the process of the API which is specified by the URL and which unlocks the door key authenticates the user on the basis of the received authentication information and executes a process for unlocking the door key when the authentication is successful.

It should be noted that since systems that perform various mechanical control such as locking and unlocking of a key and opening and closing of a door from the server device 10 or the like via a network are widely known, the detailed description thereof will be omitted here.

[Control of update frequency] In addition, the processing information registered as an event may include an instruction to control the transmission frequency of the spatial sense information of the terminal device 20.

Figure 6:
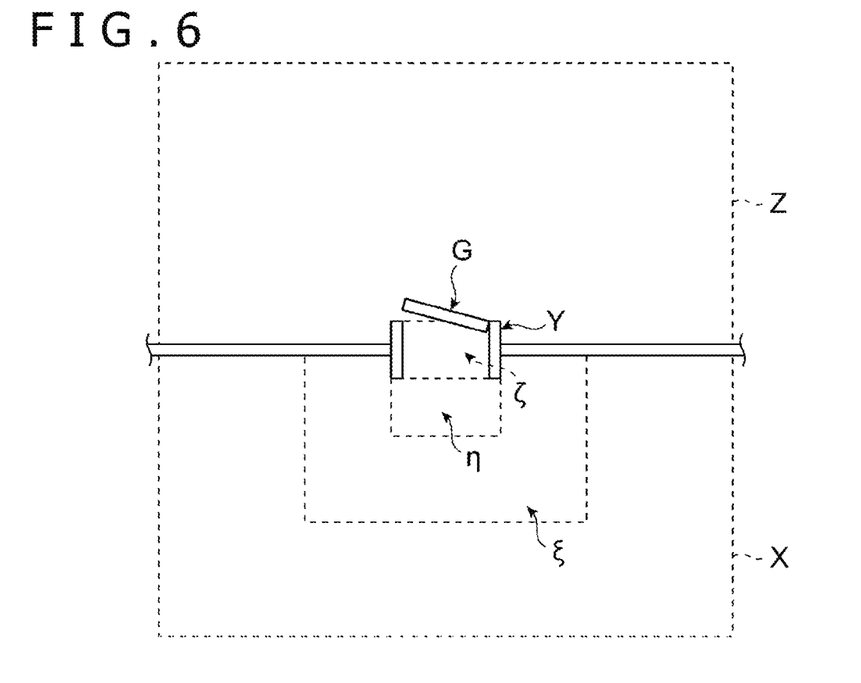
FIG. 6 is an explanatory diagram for depicting a setting example of a region to be covered by the information processing system according to the embodiment of the present invention.

For example, as depicted in FIG. 6, when a region X and a region Z are constructed to be capable of coming and going through a ticket gate Y provided with a door G, a trigger condition that the terminal device 20 is located in a predetermined region ξ near the ticket gate Y in the region X (the location indicated by the position information obtained on the basis of the spatial sense information received from the terminal device 20 indicates a position within the predetermined region ξ) and processing information for setting the detection frequency of the spatial sense information of the terminal device 20 to be higher than the frequency with which the spatial sense information is detected when the terminal device 20 is located outside the region ξ may be registered in the event database in association with each other.

In this case, when the user holding the terminal device 20 enters the region ξ, the server device 10 thereafter detects that the terminal device 20 is in the region ξ on the basis of the spatial sense information transmitted by the terminal device 20, and the processing information for setting the detection frequency of the spatial sense information of the terminal device 20 to be higher than the frequency with which the spatial sense information is detected when the terminal device 20 is located outside the region ξ is sent to the terminal device 20 on the basis of the trigger condition stored in the event database.

The terminal device 20 receives the processing information, thereafter obtains the spatial sense information at a relatively high frequency, and sends the spatial sense information to the server device 10.

It should be noted that in this example, when the user holding the terminal device 20 exits the region ξ, the terminal device 20 enters a state in which an instruction (processing information) to change the detection frequency of the spatial sense information is not received from the server device 10, so that the terminal device 20 may control itself to obtain the spatial sense information with a normal frequency (before increasing the frequency) after a predetermined time has elapsed since the above-described state and transmit the spatial sense information to the server device 10.

[Relation between events] Further, a plurality of events registered in the event database may be associated with each other. For example, among the events registered in the event database, there may be an event that includes triggering of another event in the trigger condition.

Specifically, in the example of FIG. 6, a region η near the entrance/exit of the ticket gate Y and a region ζ in the ticket gate are further set in the region ξ of the region X, and the following may be registered in the event database as events.
(Event 1) trigger condition: located in the region Z and located in the region ζ in the recent past, processing information: a settlement process of a fee and display that the fee has been paid (display an interface to notify the user that the fee has been paid)
(Event 2) trigger condition: located in the region η and the display means of the terminal device 20 cannot be confirmed (alternatively, a state in which the user interface cannot be presented in the terminal device 20 or a case in which the user sets in advance not to pay the fee in this case), processing information: close the door G In this example, when the user holding the terminal device 20 enters the region η, the terminal device 20 displays a user interface for requesting the confirmation of the intention to pay the fee, according to an instruction received from the server device 10. For example, it is assumed that the user interface indicates that the user is charged when entering the region Z from the region ζ.

When the user enters the region ζ while viewing the user interface, the server device 10 opens the door G. Then, when the user enters the region Z through the door G, the server device 10 executes a settlement process on the assumption that the trigger condition (1) is satisfied.

As described above, an event of a predetermined mode, such as charging a fee in connection with whether or not the user is located in a certain region, may be registered only by a business operator or the like (for example, a business operator or the like authorized by the administrator of the server device 10) satisfying a predetermined standard.

In addition, in a case where the terminal device 20 cannot display the user interface for requesting the confirmation of the intention to pay the fee, the server device 10 closes the door G when the user enters the region ζ, on the assumption that the trigger condition (2) is satisfied. It should be noted that in this example, the device for controlling the door G of the ticket gate Y may perform control to close the door G when someone enters the region ζ in a state in which there is not any instruction from the server device 10.

In addition, the device for controlling the door G also performs control to close the door G for the user who does not hold the terminal device 20, on the assumption that someone enters the region ζ in a state where the user interface cannot be displayed from the server device 10.

As described above, in the example of the present embodiment, the trigger conditions of an event may include conditions such as that the trigger condition of another event has been satisfied in the past (or satisfied within a predetermined time in the past) and that predetermined information processing performed on the basis of the processing information of another event has been executed.

[Example of arranging edge server] It should be noted that in the above description of the present embodiment, the server device 10 manages events relating to all regions regardless of the range of the world coordinate system, but the present embodiment is not limited to this, and what is generally called an edge server that divides the service region into a plurality of small regions to manage an event in the small region for each divided small region may be arranged.

In this case, the edge server executes the function as the server device 10 described above, in addition to the operation as the event management unit 24. In addition, in this case, a server device functioning as at least the event management unit 24 is arranged as a central server device. Then, among the events stored in the event database, the central server device sends, to each edge server, events relating to a trigger condition unrelated to the position information and a trigger condition related to the position information relating to the small region managed by the edge server (including information for specifying the information processing base in the small region managed by the edge server), and registers the events in the event database in the edge server.

It should be noted that in this example, it is not necessary for the edge server itself to perform information processing based on the processing information. The processing information of an event to be executed (an event with the trigger condition satisfied) may be sent to the central server device, and the information processing may be performed by the central server device. In this case, it is preferable to keep a communication path between the edge server and the central server device secure by encrypting the communication path.

Further, in a case where the edge server is arranged, when the edge server receives various kinds of data from the terminal device 20 and when a condition relating to the communication path is satisfied, the edge server notifies the terminal device 20 of an error, and may perform control not to perform a process according to an instruction even when receiving the instruction from the terminal device 20. Here, the condition relating to the communication path may be, for example, a condition in which TTL (Time To Live) or the number of hops (the number of communication relay points) exceeds a predetermined specified value, or the like.

In this way, in a case where a user who is not actually present at a place is falsifying the place, the number of hops increases because the communication path generally becomes long. Therefore, it is possible to control such that an instruction from a user who falsifies a place is not accepted.

[Modified example] In addition, in a case where the terminal device 20 displays a virtual object as a process based on the processing information in the present embodiment, the user may input information by operating the virtual object.

For example, on the basis of processing information for displaying three-dimensional image data of a product as a virtual object and a virtual object of a basket for checkout together with the three-dimensional image data, when the terminal device 20 displays the image of the product and the image of the basket and when the user performs an operation of picking up the product and moving it to the basket, the terminal device 20 may transmit, on the assumption that there is an instruction to purchase the product, input information of the fact to the server device 10. It should be noted that a widely known process can be employed for determining that the user has grasped the product or for moving the grasped virtual object in the virtual space, and thus the description thereof will be omitted here.

[Invalidation process on terminal device side] In addition, in an example of the present embodiment, when accepting processing information associated with a trigger condition from the server device 10, the terminal device 20 determines whether or not the processing information satisfies a predetermined condition. When determining that the processing information does not satisfy the predetermined condition, the terminal device 20 may ignore instructions included in the processing information, that is, an instruction to display a user interface, an instruction to display information content, and the like. Accordingly, for example, when the predetermined condition is not satisfied, the terminal device 20 operates so as not to indicate the intention of charging.

The condition in this case may be, for example, a condition that the position information at the time of accepting the processing information is a predetermined region. As an example, the predetermined region may be, for example, a region preliminarily set by the user or the administrator of the system, such as the home of the user or a public region.

Alternatively, the condition can be a condition that the area set for charging is larger than a predetermined threshold value or a condition that a fee is charged only when the user temporarily passes. By setting such a condition, it is possible to prevent the user from being charged when the user has only entered a certain place, when a region subject to the charging is unnaturally large, and when the user has only moved slightly or has only temporarily passed through a certain point by mistake. Therefore, when a server camouflaging the server device 10 is installed, it is possible to prevent processing information from being provided to the terminal device 20 by the server and prevent a process such as charging from being performed on the basis of the processing information.

It should be noted that the above condition may be set freely by the user of the terminal device 20.

[Effect of embodiment] The present embodiment has effects of improving the convenience of using position information, solving a problem such as preventing illegal authentication and spoofing even when performing authentication based on position information without an external device, and reducing the cost of introducing an external device.

REFERENCE SIGNS LIST

10: Server device
11: Control unit
12: Storage unit
13: Communication unit
20: Terminal device
21: Authentication processing unit
22: Terminal position estimation unit
23: Condition determination unit
24: Event management unit
25: Event processing unit
30: Position information management server

The invention claimed is:

1. An information processing system comprising:
a terminal device capable of being carried by a user; and
a server device communicably connected to the terminal device by a secure communication method,
wherein the terminal device is configured to:
acquire a sensing result, the sensing result identifying a location of the terminal device in a real space where the terminal device is located, and send the sensing result to the server device,
wherein the server device is configured to:
store base information that specifies at least one position in the real space, as an information processing base,
receive reception means for the sensing result from the terminal device, and
send, in a case where a predetermined condition defined using a distance or a direction between a position specified by the sensing result and a position specified by the base information is satisfied and based on an event identifier associated with the predetermined condition, an information processing instruction associated with the event identifier to the terminal device, and wherein the terminal device is further configured to:
accept the information processing instruction from the server device to execute a predetermined process.

2. The information processing system according to claim 1, wherein
the server device is configured to store information of a virtual space associated with the position of the real space and to provide, in a case where there is information of the virtual space associated with a position in a vicinity of a position specified by the sensing result received, the information of the virtual space to the terminal device that is the transmission source of the sensing result, and
the terminal device is capable of presenting an image of a virtual space represented by the information of the virtual space to the user when the information of the virtual space is provided from the server device.

3. The information processing system according to claim 1, wherein, as the predetermined process, a process for accepting a predetermined information input by the user is executed.

4. The information processing system according to claim 3, wherein the predetermined information input is performed by an operation of the user on a virtual object arranged in a virtual space.

5. The information processing system according to claim 1, wherein
the server device repeatedly receives the sensing result from the terminal device at every predetermined timing, and
the server device sequentially records, in a recording, the position specified by the received sensing result, and sends the information processing instruction to the terminal device in a case where the recording satisfies a predetermined first condition.

6. The information processing system according to claim 1, wherein, when determining that the user carrying the terminal device is not able to recognize information from the server device, the server device performs control not to execute at least the predetermined process.

7. The information processing system according to claim 1, wherein
the server device is a server device for executing a process for accepting a predetermined information input by the user as the predetermined process,
the server device repeatedly receives the sensing result from the terminal device at every predetermined timing, and
the server device sequentially records, in a recording, the position specified by the received sensing result, and performs control not to execute a process based on a predetermined information input by the user, in a case where the recording satisfies a predetermined second condition.

8. The information processing system according to claim 1, wherein, when receiving information from the terminal device, the server device performs control not to execute at least the predetermined process in a case where a predetermined condition relating to a communication path between the server device and the terminal device is satisfied.

9. The information processing system according to claim 1, wherein the terminal device repeatedly acquires, at every predetermined timing, the sensing result identifying a location of the terminal device in the real space where the terminal device is located, sends the sensing result the server device, and performs control to increase a frequency of sending the sensing result when receiving the processing instruction.

10. The information processing system according to claim 1, wherein, when accepting the processing instruction from the server device, the terminal device performs control not to execute a process based on the processing instruction when a predetermined condition is not satisfied.

11. A non-transitory, computer readable storage medium containing a program, which when executed by a computer including a server device communicably connected by a secure communication method to a terminal device that is capable of being carried by a user, that acquires a sensing result identifying a location of the terminal device in a real space where the terminal device is located, and that sends the acquired sensing result to the server device, causes the computer to carry out a method by carrying out actions, comprising:
storing base information that specifies at least one position in the real space as an information processing base;
receiving the sensing result from the terminal device; and
sending, in a case where a predetermined condition defined using a distance or a direction between a position specified by the received sensing result and a position specified by the base information is satisfied and based on an event identifier associated with the predetermined condition, an information processing instruction associated with the event identifier to the terminal device.

* * * * *

UNITED STATES PATENT AND TRADEMARK OFFICE
CERTIFICATE OF CORRECTION

PATENT NO. : 12,422,514 B2  
APPLICATION NO. : 17/775272  
DATED : September 23, 2025  
INVENTOR(S) : Yoshinori Ohashi Page 1 of 1

It is certified that error appears in the above-identified patent and that said Letters Patent is hereby corrected as shown below:

In the Claims

Claim 1, Line 14 (Column 15, Line 6), please delete "reception means for".

Signed and Sealed this  
Twenty-fifth Day of November, 2025

John A. Squires  
*Director of the United States Patent and Trademark Office*